(12) United States Patent
Burroughs

(10) Patent No.: US 6,504,805 B1
(45) Date of Patent: Jan. 7, 2003

(54) TRACK IDENTIFICATION GENERATION FOR OPTICAL DISK

(75) Inventor: Alan Claude Burroughs, San Jose, CA (US)

(73) Assignee: Terastor Corporation, San Jose, CA (US)

(*) Notice: Subject to any disclaimer, the term of this patent is extended or adjusted under 35 U.S.C. 154(b) by 0 days.

(21) Appl. No.: 09/360,298

(22) Filed: Jul. 22, 1999

(51) Int. Cl.[7] .............................................. G11B 7/00
(52) U.S. Cl. .............................. 369/59.11; 369/47.52; 369/13.33
(58) Field of Search ..................... 369/13.02–13.05, 369/13.14–13.17, 13.22–13.26, 116, 59.11, 59.12, 47.5, 47.51, 53.26, 53.27, 13.32, 13.33

(56) References Cited

U.S. PATENT DOCUMENTS

| | | | | |
|---|---|---|---|---|
| 4,695,993 A | * | 9/1987 | Takagi et al. | 369/53.2 |
| 4,712,203 A | * | 12/1987 | Saito et al. | 369/13.02 |
| 5,034,934 A | * | 7/1991 | Naito et al. | 369/13.02 |

* cited by examiner

Primary Examiner—Thang V. Tran
(74) Attorney, Agent, or Firm—Fish & Richardson P.C.

(57) ABSTRACT

A wedge data writer writes wedge data, including track identification information, that are spatially-aligned along the radial direction of an optical disk. The wedge data are written at the beginning of a wedge when at least one radial groove or pit molded into the disk is detected.

41 Claims, 7 Drawing Sheets

TRACK IDENTIFICATION GENERATION FOR OPTICAL DISK

BACKGROUND

The present specification relates to writing track information on an optical disk for a track identification process.

An optical disk has circumferentially-arranged, spiral tracks that comprise data storage tracks. In certain optical disks, each track is divided into portions called "wedges." Each wedge has a track and wedge identification information written at the beginning of the wedge. The wedge identification information on a disk surface is read by the reflected beam from the disk.

The wedge identification information may include embossed signals indicating track alignment and track seeking information. Clock synchronization signals are often recorded at the start of the wedge to synchronize a decoding clock circuit and to facilitate decoding of the track identification information during track seeking and track following modes.

However, such a system may require additional timing circuitry necessary for synchronization during track seeking and additional clock track necessary for writing the track identification information. In addition, the signal read back from embossed pits varies with head fly-height. The embossed pits are subject to debris and contamination collecting in the pits, which result in poor read back reliability.

SUMMARY

The present disclosure involves writing wedge data, which are spatially aligned along the radial direction, using a wedge data writer. The wedge data can include track identification information. When at least one radial groove or pit molded into an optical disk is detected, the wedge data writer writes the wedge data in an area immediately following the radial pit. The wedge data written using the above-mentioned process may simplify track identification process, such as during a track seek.

In one aspect, the wedge data writer includes a pit detector, a coil driver, and a wedge data generator. In one embodiment, the writer also includes a beam coupling element, such as an optical lens system, which is configured to illuminate an optical disk with light. The pit detector receives reflected light from the optical disk and is capable of detecting the radial pit at the beginning of the wedge. The pit detector generates a trigger signal once the radial pit is detected. The coil driver receives the wedge data and energizes an electromagnetic coil to write the wedge data on the disk surface. The wedge data generator generates and sends laser pulses to the beam coupling element and the wedge data to the coil driver when the trigger signal is enabled by the pit detector. The beam coupling element and the electromagnetic coil are synchronized by the wedge data writer.

In some embodiments, the writer also includes a processor or state-machine configured to update the wedge data stored in the wedge data generator after the wedge data are sent to the optical lens system and the coil driver to be written.

In another aspect, a method for writing wedge data is disclosed. The method includes illuminating a beam of light onto an optical disk, receiving the reflected beam of light, generating a trigger signal when the reflected beam of light indicates the presence of a radial pit, outputting the wedge data for writing when the trigger signal is enabled, and writing the wedge data on the optical disk.

In another aspect, a computer-implemented process for use in writing wedge data on an optical disk is disclosed. The disk has a beginning track and an ending track where the tracking information in the wedge data is spatially aligned along the radial direction. The process includes commanding a beam writer to move to the beginning track and to follow grooves along the track, detecting radial pits molded into the optical disk, generating a trigger signal, and writing the wedge data when the trigger signal is enabled. The process also includes determining if the ending track has been reached, and exiting if it has been reached; and updating the wedge data for the next wedge if not.

The details of one or more embodiments are set forth in the accompanying drawings and the description below. Other embodiments and advantages will become apparent from the

BRIEF DESCRIPTION OF THE DRAWINGS

These and other aspects will be described in reference to the accompanying drawings wherein.

Like reference numbers and designations in the various drawings indicate like elements.

DETAILED DESCRIPTION

The present disclosure involves a wedge data system for an optical disk. The system can write track identification information on an optical disk, such as a magneto-optic (MO) disk, in a way that allows efficient and rapid track identification. The system comprises at least a number of radial wedge marks formed on the disk defining beginnings of respective wedge-shaped areas or "wedge." The wedge marks can be radial marks or pits in a preferred embodiment. The radial pits are used to time synchronize laser beam pulses that write the track identification information. The track information may include a track number and a wedge number. The resulting track identification information is spatially aligned along the radial direction. Since the wedge marks are along the radial direction, efficient decoding of the information with much simplified circuitry is possible.

Figure 1:
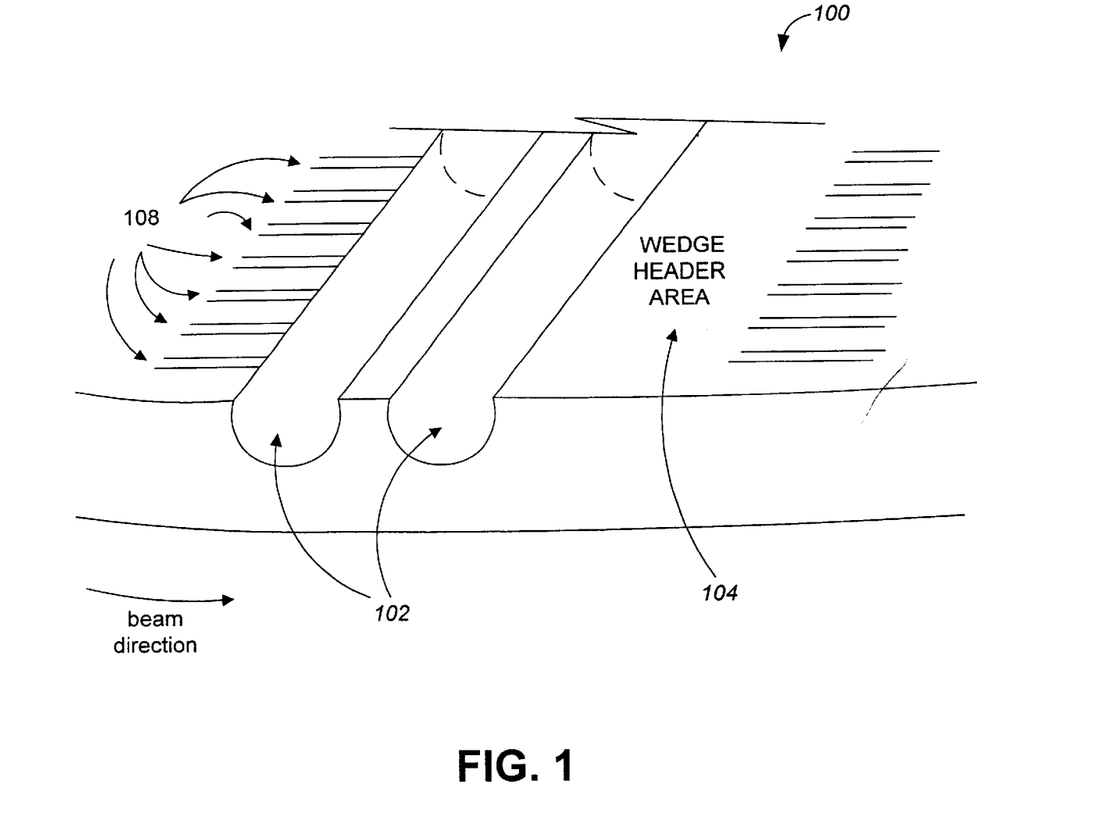
FIG. 1 is a side perspective view of one embodiment of molded radial pits.

FIG. 1 shows a side perspective view of one embodiment showing the molded radial pits 102. These radial pits 102 are molded into an optical disk 100 at the beginning of each wedge. The track identification information is written into a wedge header area 104 immediately following the radial pits 102. Therefore, the radial pits 102 are used to time synchronize the laser beam pulses that write the track identification information on the wedge header area 104 during a write process.

In one embodiment, the wedge headers are written in a wedge format. The wedge format used is a gray code, which has the track numbers and wedge numbers written along the track on an optical disk 100. This allows the disk drive to read track numbers (e.g., in Gray Code) during a seek which enables a better control loop during a fast seek than a format that does not support reading track numbers during a seek.

The magnetic data wedge headers are useful in a first surface recording because they are readable over a large range of thin film stack compositions and thicknesses. Since the data are written after the disk is molded and coated, the disk mastering process does not require dual beam mastering. For optical recording, each wedge pit may be a shallow groove with a depth less than a wavelength.

Figure 2:
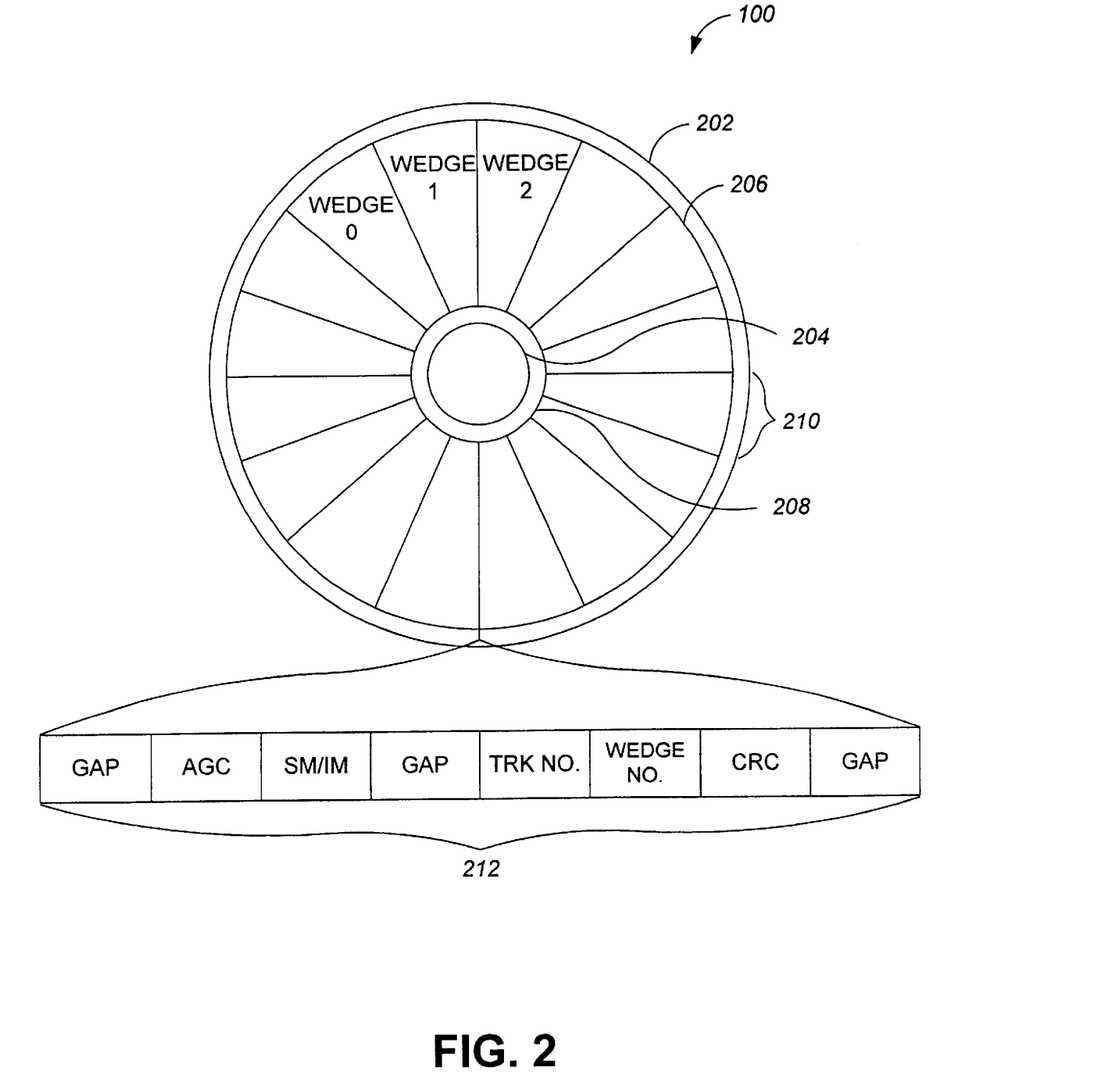
FIG. 2 is a schematic illustration showing an optical disk in a wedge format.

FIG. 2 is a schematic illustration showing the optical disk 100 in a wedge format. This shows the generally circular disk being divided into a number of wedge-shaped sections. The disk 100 with an outer diameter 202 and an inner diameter 204 has a predetermined number of revolutions of either concentric or spiral tracks between a disk outside diameter 206 and a disk inside diameter 208. Each complete track is preferably divided into an integral number of "bit cells" with equal size in units of servo channel bits ("SCB"). The plurality of wedges intersecting all of the tracks are labeled as wedge 0, wedge 1, etc., by "spoke" type wedge headers 212. The wedge-shaped areas 210 between the wedge headers 212 are user data areas having user data sectors. The number of user data sectors per track varies with radius. Although the total number of user data sectors in SCB per track is an integer, each wedge need not contain an integral number of data sectors. The disk 100 in FIG. 2 can use a variable user data rate depending on track radius and has a constant wedge data rate for all track radii if the disk spins at a constant angular velocity.

Figure 3:
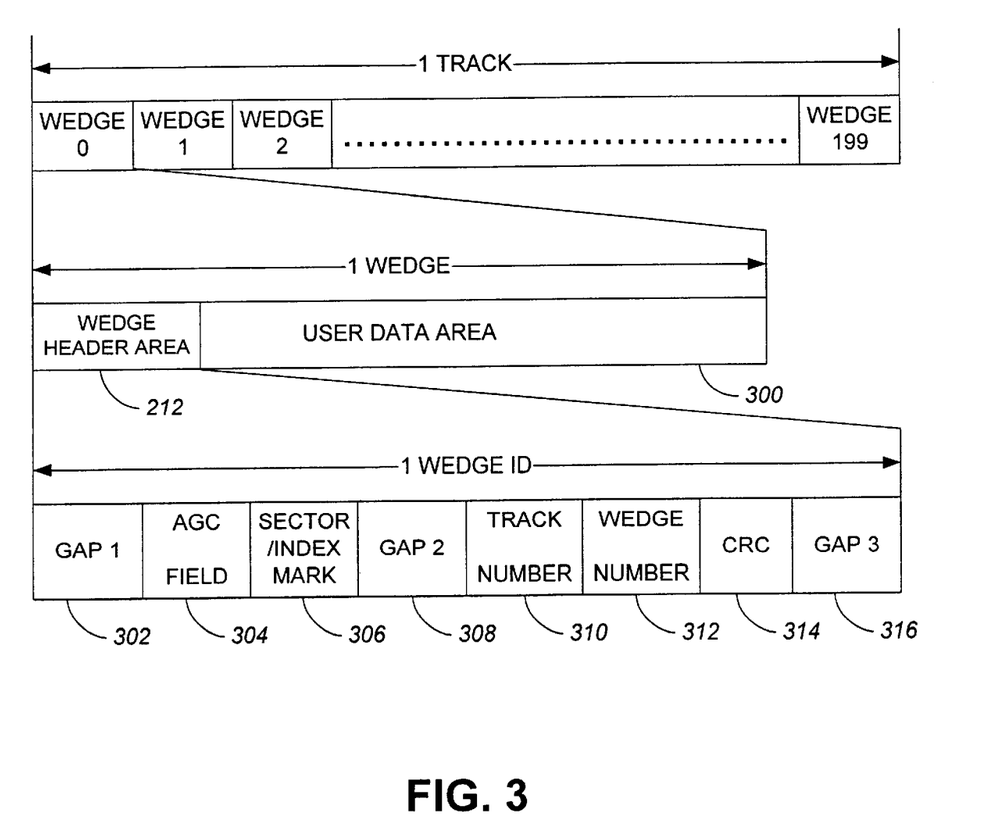
FIG. 3 is an illustration of a preferred wedge format of an optical disk.

One preferred wedge format is further illustrated in FIG. 3. The size of a wedge is predetermined, e.g., 5000 SCB for a track of $1 \times 10^6$ SCB in a disk 100 with 200 wedge headers. Each wedge comprises a small header field (e.g., section 212 of FIG. 3 having 250 SCB) and a data field (e.g., section 300 of FIG. 3 having 4750 SCB) for storing the user data. The wedge header area 212 can be further partitioned into multiple sub-fields for various wedge marks and other digital tracking data. For the example shown in FIG. 3, the wedge header area 212 includes three gap fields 302, 308, 316 of different sizes, one sub-field for an automatic-gain-control ("AGC") field 304, one sub-field for the sector/index address mark 306, one sub-field for the track number 310, one sub-field for the wedge number 312, and one sub-field for the cyclical redundancy code ("CRC") 314 to verify error-free readout of the track number 310 and the wedge number 312.

Specifically, the first gap field 302 is used to account for system tolerances for switching from reading or writing user data to reading wedge data and to account for spindle speed variations. The AGC field 304 includes a special pattern that the read channel uses to adjust a gain to account for tolerances in head, disk, and electronic system. The sector/index mark 306 includes a special defect tolerant pattern to allow the system to obtain a bit level timing reference to the wedge data. The second gap field 308 is used to allow system electronics to switch from sector/index mark detection mode to reading wedge data mode. The track number 310 includes a Gray Code representation of the track number which provides information indicative of the absolute radial position. The wedge number 312 includes a 2-bit binary encoded representation of the wedge number which can be used to provide the information on the absolute circumferential position. The third gap field 316 allows the system electronics to verify that the head is at the desired location on the disk surface and to switch modes from reading wedge data to reading or writing user data.

Figure 4:
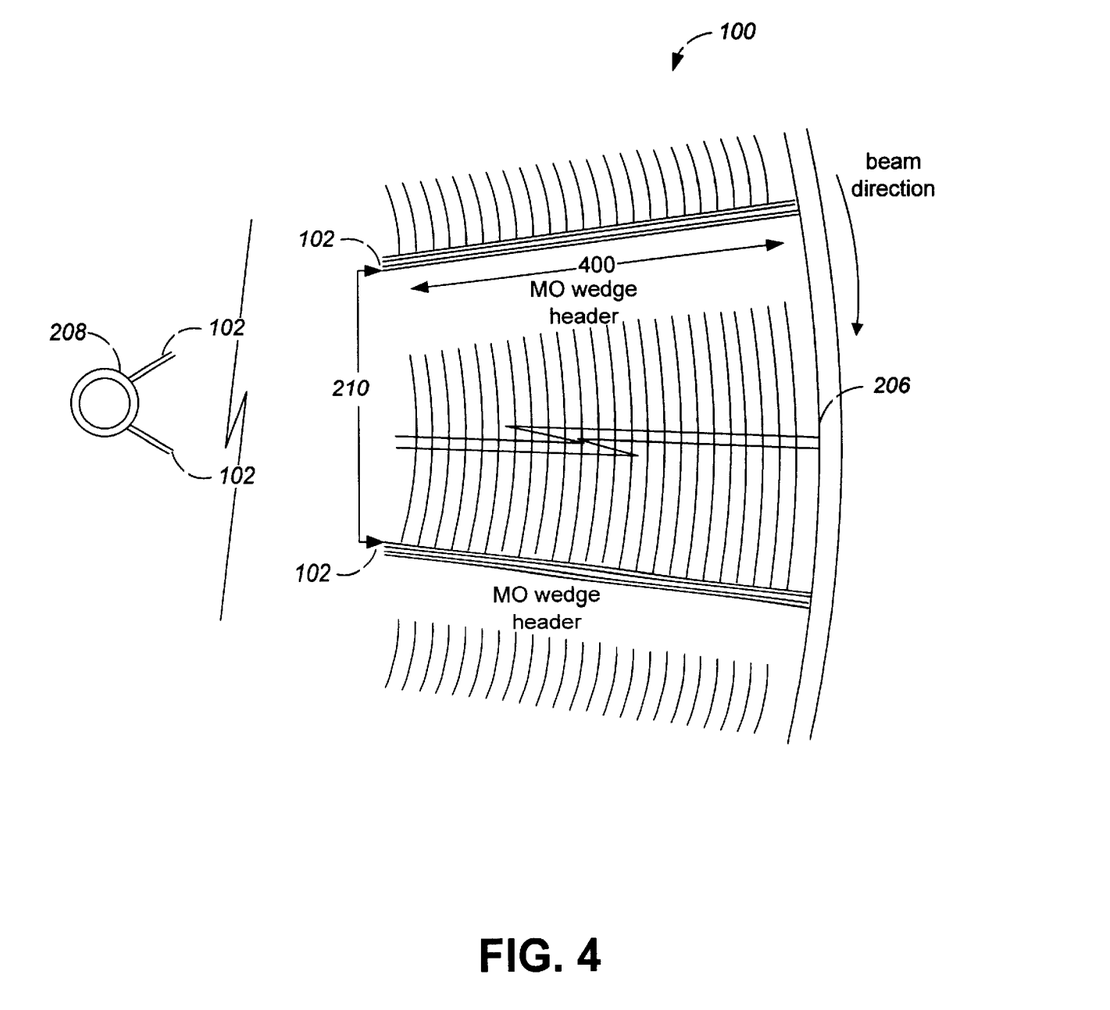
FIG. 4 is a top view of an optical disk with radial pits extending radially outward from the center.

FIG. 4 shows a top view of the optical disk 100 with the radial pits 102 extending radially outward from the disk inside diameter 208 to the disk outside diameter 206. The pits 102 extend radially in a straight or curved line. Any track information written immediately following the radial pits is spatially aligned along the radial direction. The molded optical disk 100 provides all tracking signals needed, and the radial pits at the beginning of each wedge 210 provide proper time synchronization necessary to write each wedge header. The Gray-Code-encoded track number can be decoded using a beam 400 moving across the disk 100.

Figure 5:
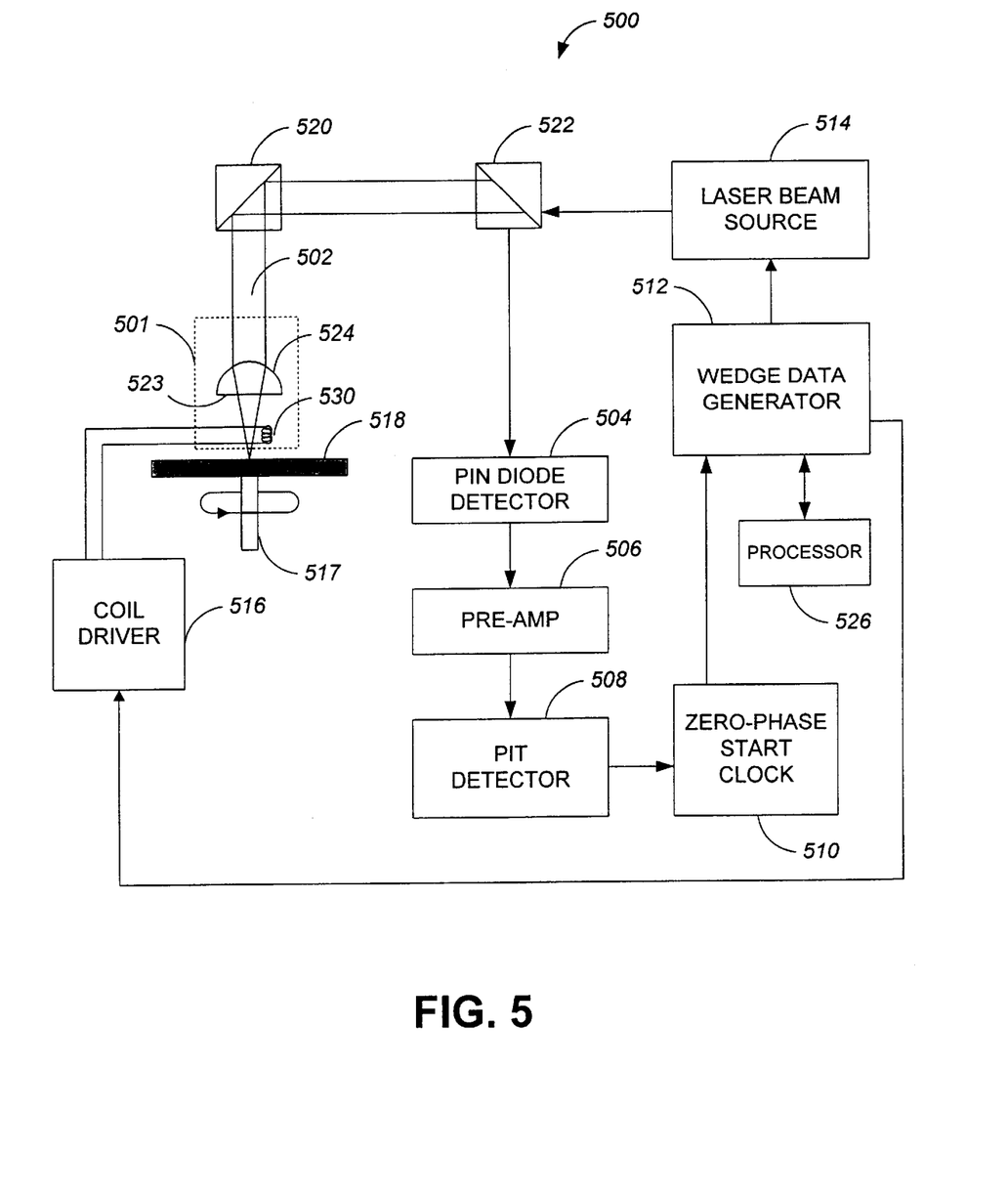
FIG. 5 is one embodiment of a wedge data writer.

FIG. 5 shows one embodiment of a wedge data writer 500. A laser beam source 514 generates a beam 502 which passes through beam splitters 520, 522 to illuminate the surface of an optical recording medium in the form of a disk 518. The laser beam 502 is focused onto the surface of the optical disk 518 by an optical flying head 501 which includes an optical lens system 524 and a coil 530. Alternatively, in a near-field situation, the flying head 501 and the disk surface 518 are positioned relative to each other so that the optical spacing therebetween is less than one wavelength of the beam 502 produced by the laser beam source 514. In the near-field situation, the optical lens system 525 includes a near-field lens, such as a solid immersion lens (SIL), and acts as a beam coupling element to couple the optical energy converging near the flat portion 523 of the SIL onto the surface of the disk 518 with evanescent waves. The focused beam 502 passes over different areas on the disk surface as the disk 518 rotates. The disk is placed on a disk holding element 517 including a spindle and a motor for rotating the disk. A photodetector 504, such as a pin diode detector, detects reflections from the disk surface.

When the beam 502 passes over the radial pits indicating the beginning of a wedge, the focused beam 502 is reflected with a different intensity than the flat surface of the disk 518. The photodetector 504 hence detects pulses corresponding to the pits in the form of a light intensity (RO) signal. The RO signal is generated by the reflected laser beam.

The RO signal detected by the photodetector 504 is amplified by a pre-amplifier 506 and is passed on to a pit detector 508. The pit detector 508 generates a trigger pulse when the detected RO signal exceeds a certain threshold. The trigger pulse at the output of the pit detector 508 triggers a zero-phase start oscillator 510.

The zero-phase start oscillator 510 generates a start pulse that triggers a wedge data generator 512. The wedge data generator 512 generates a correct wedge data to be written based on the disk characteristics and position. This is clocked out by the oscillator 510. The wedge data at the output of the wedge data generator 512 is sent to the electromagnetic coil 530. The wedge data generator 512 also sends the oscillator clock to the laser beam source 514 for writing the wedge data. Then, the wedge data is updated by a processor 526 after each wedge is updated.

Figure 6:
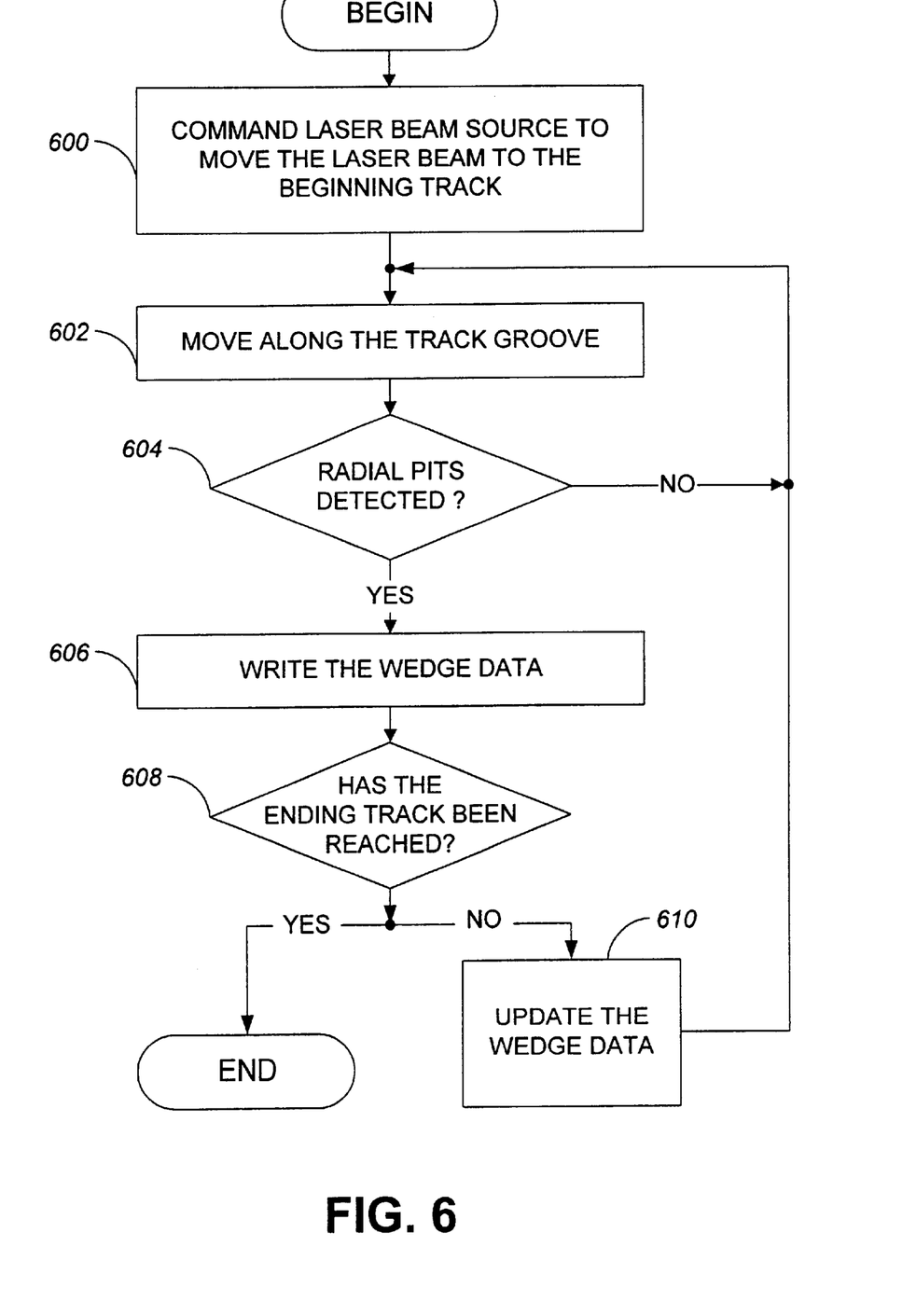
FIG. 6 is a flow diagram of a wedge data writing process.

FIG. 6 shows a flow diagram of a wedge data writing process. The process may be a computer-implemented process or a computer program residing on a computer-readable medium in the wedge data writer system.

The wedge data writing process starts at the beginning track, at step 600, and spirals inward or outward toward the ending track by using track grooves 108, at step 602. In one embodiment, the beginning track is the disk outside diameter 206 and the ending track is the disk inside diameter 208.

The track grooves spiral inward from the disk outside diameter 206 to the disk inside diameter 208. In another embodiment, the tracks are reversed and they spiral outward from the disk inside diameter 208 to the disk outside diameter 206. The tracking loop is closed on the spiral track grooves 108.

At the start of each wedge, the pits are detected, at step 604, and the wedge data is written, at step 606, using the wedge data writer 500. If the ending track 208 is encountered, at step 608, the process ends. Otherwise, the wedge data is updated, at step 610, and the process continues to the next wedge header area by moving along the track groove, at step 602.

FIGS. 7A through 7E illustrate one embodiment of the wedge data writing process at each wedge. The figures describe in detail the writing process of the step 606 in FIG. 6.

Figure 7A:
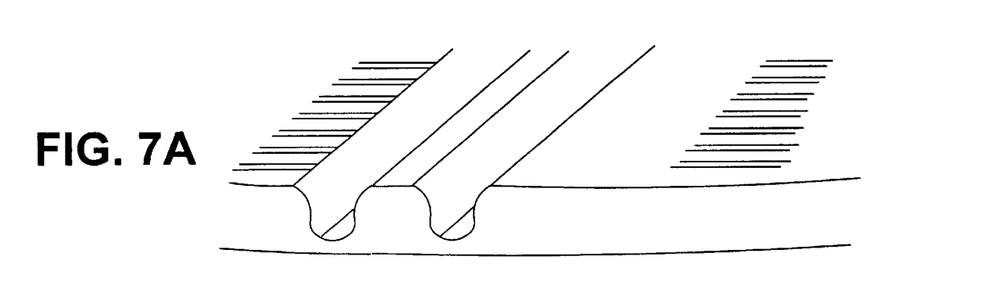
FIGS. 7A through 7E show one embodiment of the wedge data writing process at each wedge.
Figure 7B:
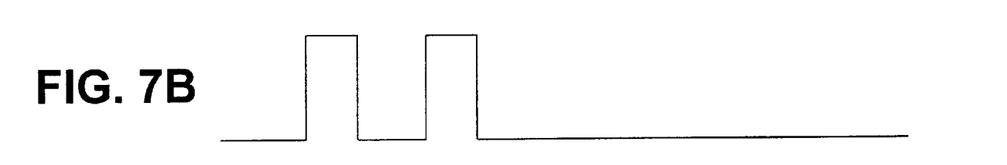
Figure 7C:
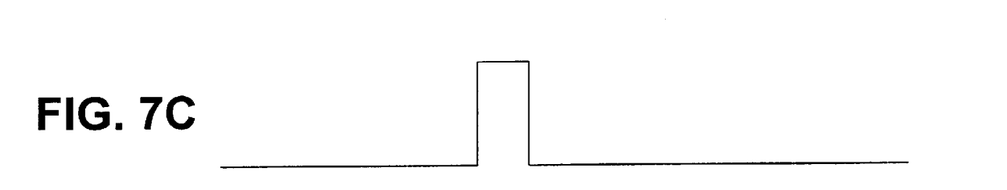
Figure 7D:
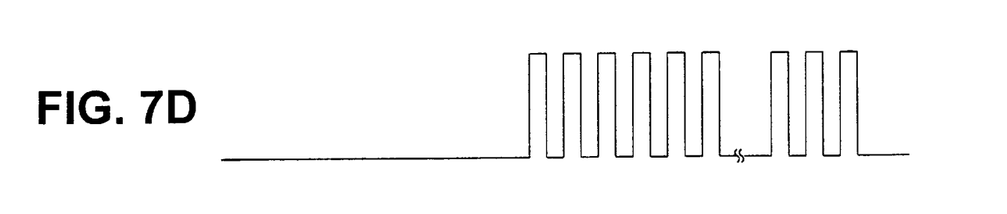
Figure 7E:
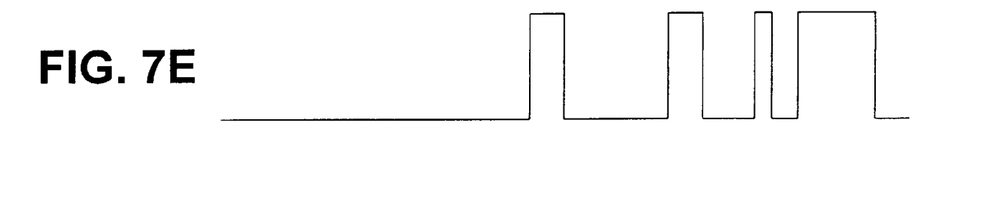

FIG. 7A shows an end view of the disk surface showing the radial pits. The process starts when the pit detector 508 detects the pulses, shown in FIG. 7B, corresponding to the pits. The pit detector 508 then generates a trigger pulse (e.g. FIG. 7C) to start the zero-phase oscillator 510. The start oscillator 510 outputs pulses (e.g. FIG. 7D) to the wedge data writer 512. The pulses are used by the wedge data writer to send laser data 513 to the laser beam source 514 for illuminating the disk surface. The pulses are also used to clock out the wedge data 515 to the coil driver 516. FIG. 7E shows an example of the wedge data sent to the coil driver 516. The laser data 513 and the wedge data 515 are time synchronized by the wedge data writer 512 to illuminate the disk surface with the laser data 513 when the electromagnetic coil 530 is ready to write the wedge data 515 at the beginning the wedge.

The purpose of the radial pits is to set the position of writing of the wedge data. Thus, the pits are used once when the wedge data are written. The pits are effective later during the life of the disk to trap and hold particles that accumulate on the disk surface. Therefore, a pit is preferred as the wedge mark. However, other wedge marks could be alternatively used—e.g. tabs on the disk or simply reflection-characteristic-altered portions.

The wedge data system also involves an optical storage medium in the form of a disk with the wedge data written in a spatially-aligned Gray-code format and an optical disk reader. The disk can be a magneto-optic disk, a write-once disk, a phase-change disk, or a read-only disk. The wedge data, including the track number and the wedge number, written in the Gray-code format are read by the optical disk reader.

The disk reader includes an optical lens system, a detector, a decoder, and a processor. The optical lens system illuminates the surface of an optical disk with a laser beam. The detector detects the reflected laser beam from the disk surface. The decoder decodes the Gray-code encoded wedge data written on the disk surface. The processor processes the wedge data for use in track-related operations.

The optical lens system may be included in a flying head. In one embodiment, the flying head is spaced less than the wavelength of the laser beam from the disk surface for near-field operation.

The lensing elements may include a reflector, an objective lens, and a solid immersion lens. The lensing elements focus the beam of laser onto the disk surface.

Although only a few embodiments have been described in detail above, those of ordinary skill in the art certainly understand that modifications are possible. For example, some versions of the wedge data writer and the process described above are implemented in digital discrete components, in application specific integrated circuits (ASICs), in computer programs executed by programmable processors, or in some combination of these technologies. All such modifications are intended to be encompassed within the following claims, in which:

What is claimed is:

1. An optical disk wedge data writer system adapted to write wedge data on an optical disk, comprising:
    a wedge mark detector configured to detect, in operation, the presence of at least one wedge mark on said optical disk, and to generate a trigger signal;
    a laser beam source operable to transport and position a laser beam, to illuminate the disk in response to said trigger signal;
    a coil driver having an electromagnetic coil, the coil driver configured to energize the coil with wedge data when the wedge data are received; and
    a wedge data generator configured to send clock pulses to the laser beam source and the wedge data to the coil driver when the trigger signal is received.

2. The system of claim 1, further comprising:
    a beam coupling element to couple the laser beam onto the disk.

3. The system of claim 2, wherein the beam coupling element is an optical lens system.

4. The system of claim 1, further comprising:
    a disk holding element capable of holding the optical disk, said optical disk divided into a plurality of wedge-shaped sections, each section having at least one wedge mark at the beginning of the section.

5. The system of claim 1, wherein said wedge marks are pits.

6. The system of claim 1, wherein the wedge mark detector includes:
    a photodetector detecting a reflection which indicates the presence of said at least one wedge mark and generating a first signal to indicate the detected wedge marks;
    an amplifier coupled to the photodetector, where the amplifier amplifies the first signal and generates a second signal having a pulse corresponding to the end of said at least one wedge mark; and
    an oscillator coupled to the amplifier and configured to generate a start clock that triggers the wedge data generator when the second signal has said pulse.

7. The system of claim 1, further comprising:
    a processor coupled to the wedge data generator and configured to update the wedge data stored in the wedge data generator after the wedge data are sent to the coil driver to be written.

8. The system of claim 1, wherein the wedge data include a track number and a wedge number.

9. The system of claim 8, wherein the track number is encoded in Gray Code.

10. A wedge data writer system having an optical disk divided into multiple wedges, each wedge molded with at least one wedge mark at the beginning, the system comprising:
    an optical lens system configured to illuminate the optical disk with light when laser pulses are received;
    a detector configured to receive reflected light from the optical disk, the detector capable of detecting the at least one wedge mark at the beginning of the wedge and generating a trigger signal;

a coil driver having an electromagnetic coil, the coil driver configured to energize the coil to write the wedge data on the surface of the disk, and synchronized with optical lens system;

a wedge data generator configured to generate and send the laser pulses to the optical lens system and the wedge data to the coil driver when the trigger signal is enabled.

11. The system of claim 10, wherein the detector includes:

a photodetector to detect the presence of said at least one wedge mark and to generate a first signal to indicate the detected marks;

an amplifier coupled to the photodetector, where the amplifier amplifies the first signal and generates a second signal having a pulse corresponding to the end of said at least one wedge mark; and a clock oscillator started by the pulse from the second signal and configured to generate a clock that synchronizes the wedge data generator when the second signal is pulsed.

12. The system of claim 10, further comprising:

a processor coupled to the wedge data generator and configured to update the wedge data stored in the wedge data generator after the wedge data are sent to the coil driver to be written.

13. The system of claim 10, wherein the wedge data include a track number and a wedge number.

14. The system of claim 13, wherein the track number is encoded in Gray Code.

15. The system of claim 11, wherein the optical lens system element includes:

a beam source configured to generate light; and an optical lens coupled to the beam source and configured to focus the generated light from the beam source onto the optical disk surface.

16. The system of claim 11, wherein the clock oscillator is a zero-phase start oscillator.

17. A method for writing wedge data at the beginning of a wedge on an optical disk surface, the method comprising:

illuminating a beam of light onto the disk surface;

receiving the reflected beam of light;

generating a trigger signal when the reflected beam of light indicates the presence of at least one wedge mark;

outputting the wedge data for writing when the trigger signal is enabled; and writing the wedge data on the disk surface, wherein the generation of the trigger signal includes:

detecting the presence of the at least one wedge mark and generating a first signal to indicate the detected marks;

amplifying the first signal and generating a second signal having a pulse corresponding to the end of the at least one radial pit; and generating a start clock which is used to trigger outputting of the wedge data, where the start clock is generated when the second signal is pulsed.

18. The method of claim 17, wherein the writing includes energizing an electromagnetic coil while illuminating the disk surface with the beam of light.

19. The method of claim 17, further comprising:

updating the wedge data after outputting the current wedge data for writing.

20. The method of claim 17, wherein the wedge data include a track number and a wedge number.

21. The method of claim 20, wherein the track number is encoded in Gray Code.

22. A computer-implemented process for use in writing wedge data on an optical disk surface having a beginning track and an ending track, the process comprising:

commanding a beam writer to move its beam to the beginning track and to follow grooves along the track;

detecting wedge marks molded into the optical disk, generating a trigger signal, and writing the wedge data when the trigger signal is enabled;

determining if the ending track has been reached; and exiting the process if the inside diameter of the opposite disk has been reached; and updating the wedge data for a next wedge if not, such that tracking information in the wedge data is spatially aligned along a radial direction.

23. The process of claim 22, wherein the track grooves spiral inward from the outside diameter to the inside diameter.

24. The process of claim 22, wherein the track grooves spiral outward from the inside diameter to the outside diameter.

25. The process of claim 22, wherein the detecting, generating, and writing include:

illuminating a beam of light onto the optical disk surface;

receiving the reflected beam of light;

generating the trigger signal when the reflected beam of light indicates the presence of the radial pits;

outputting the wedge data for writing when the trigger signal is enabled; and writing the wedge data on the optical disk surface.

26. The process of claim 25, wherein the illuminating is achieved by using a near-field lens to couple light via evanescent waves.

27. The process of claim 22, wherein the generation of the trigger signal includes:

detecting the presence of at least one wedge mark and generating a first signal to indicate the detected marks;

amplifying the first signal and generating a second signal having a pulse corresponding to the end of at least one radial pit; and generating a start clock which is used to trigger outputting of the wedge data, where the start clock is generated when the second signal is pulsed.

28. A computer program, residing on a computer-readable medium, for use in writing wedge data on an optical disk surface having a beginning track and an ending track, the program comprising executable instructions that enable the computer to:

command a beam writer to move its beam to the beginning track and to follow grooves along the track;

detect radial pits molded into the optical disk, generate a trigger signal, and write the wedge data when the trigger signal is enabled;

determine if the ending track has been reached; and exit the program if the inside diameter of the opposite disk has been reached; and update the wedge data a the next wedge if not, such that tracking information in the wedge data is spatially aligned along a radial direction.

29. The computer program of claim 28, wherein the generation of the trigger signal includes:

causing detection of the presence of at least one wedge mark and generating a first signal to indicate detected marks;

causing amplification of the first signal and generation of a second signal having a pulse corresponding to the end of at least one radial pit; and causing generation of a start clock which is used to trigger outputting of the wedge data, where the start clock is generated when the second signal is pulsed.

30. The computer program of claim 28, further comprising executable instructions that enable the computer to update the wedge data after outputting the current wedge data for writing.

31. The computer program of claim 28, wherein the wedge data includes a track number and a wedge number.

32. The computer program of claim 31, wherein the track number is encoded in Gray Code.

33. An optical disk wedge data writer system adapted to write wedge data using a laser beam, the system comprising:

a disk holding element adapted to receive an optical disk having surfaces;

a beam coupling element spaced less than the wavelength of the laser beam from the disk surface to couple optical energy converging onto the disk surface with evanescent waves;

a wedge mark detector coupled to the beam coupling element and configured to detect, in operation, the presence of at least one wedge mark on said disk surface, and to generate a trigger signal;

a laser beam source operable to transport and position a laser beam, such that the laser beam source illuminates the disk with the laser beam when said at least one wedge mark is detected by the wedge mark detector;

a coil driver having an electromagnetic coil, the coil driver configured to energize the coil with wedge data when the wedge data are received; and a wedge data generator configured to send clock pulses to the laser beam source and the wedge data to the coil driver when the trigger signal from the wedge mark detector is received.

34. The system of claim 33, wherein the wedge mark detector includes:

a photodetector detecting an optical reflection which indicates the presence of said at least one wedge mark and generating a first signal to indicate the detected wedge marks;

an amplifier coupled to the photodetector, where the amplifier amplifies the first signal and generates a second signal having a pulse corresponding to the end of said at least one wedge mark; and an oscillator coupled to the amplifier and configured to generate a start clock that triggers the wedge data generator when the second signal has said pulse.

35. The system of claim 33, further comprising a processor coupled to the wedge data generator and configured to update the wedge data stored in the wedge data generator after the wedge data are sent to the coil driver to be written.

36. The system of claim 33, wherein the beam coupling element includes a solid immersion lens which interfaces with the optical disk to couple light to and from the optical disk.

37. The system of claim 3, wherein the optical lens system is a near-field lens system which couples light to the optical disk via evanescent waves.

38. The system of claim 3, wherein the optical lens system includes a solid immersion lens that interfaces with the optical disk.

39. The system of claim 10, wherein the optical lens system is a near-field lens system which couples light to the optical disk via evanescent waves.

40. The system of claim 10, wherein the optical lens system includes a solid immersion lens that interfaces with the optical disk.

41. The system of claim 15, wherein the optical lens includes a solid immersion lens.

* * * * *